United States Patent
Jassal et al.

(10) Patent No.: US 10,992,331 B2
(45) Date of Patent: Apr. 27, 2021

(54) SYSTEMS AND METHODS FOR SIGNALING FOR AI USE BY MOBILE STATIONS IN WIRELESS NETWORKS

(71) Applicants: Aman Jassal, Kanata (CA); Mohammadhadi Baligh, Ottawa (CA); Yicheng Lin, Ottawa (CA); Hamidreza Farmanbar, Ottawa (CA)

(72) Inventors: Aman Jassal, Kanata (CA); Mohammadhadi Baligh, Ottawa (CA); Yicheng Lin, Ottawa (CA); Hamidreza Farmanbar, Ottawa (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/413,094

(22) Filed: May 15, 2019

(65) Prior Publication Data
US 2020/0366326 A1   Nov. 19, 2020

(51) Int. Cl.
| | |
|---|---|
| *H04B 1/3816* | (2015.01) |
| *G06N 5/02* | (2006.01) |
| *H04L 12/24* | (2006.01) |
| *H04W 88/02* | (2009.01) |

(52) U.S. Cl.
CPC ........ *H04B 1/3816* (2013.01); *G06N 5/02* (2013.01); *H04L 41/16* (2013.01); *H04W 88/02* (2013.01)

(58) Field of Classification Search
CPC ........ H04B 1/3816; G06N 5/02; G06N 20/00; G06N 3/0445; G06N 3/0454; G06N 3/084; H04L 41/16; H04W 88/02; H04M 1/2749; H04M 1/6008; H04M 1/72563; H04M 1/72566; H04M 1/72569; H04M 1/72572

USPC ............................................. 455/558; 706/12
See application file for complete search history.

(56) References Cited

U.S. PATENT DOCUMENTS

| | | | | |
|---|---|---|---|---|
| 8,429,103 B1* | 4/2013 | Aradhye | .............. | G06N 20/00 706/12 |
| 10,396,919 B1* | 8/2019 | O'Shea | .............. | G06N 5/046 |
| 10,461,421 B1* | 10/2019 | Tran | .............. | H01Q 1/246 |
| 2008/0076386 A1* | 3/2008 | Khetawat | .............. | H04W 12/08 455/410 |
| 2009/0224867 A1* | 9/2009 | O'Shaughnessy | .............. | H04M 1/72569 340/5.1 |
| 2012/0284404 A1* | 11/2012 | Hofstaedter | .............. | G06F 15/173 709/224 |
| 2013/0237272 A1* | 9/2013 | Prasad | .............. | H01Q 3/26 455/517 |

(Continued)

FOREIGN PATENT DOCUMENTS

CN          108989973 A          12/2018

OTHER PUBLICATIONS

3GPP TSG RAN WG1 Meeting #92bis, R1-1805692, "Summary of views on CSI reporting v8", Ericsson, Sanya, China, Apr. 16-20, 2018, total 24 pages.

*Primary Examiner* — Nathan S Taylor

(57) ABSTRACT

A method in a user equipment (UE), involves configuring an artificial intelligence (AI) module in a UE to perform at least one task for wireless communications and then performing the task using the configured AI module. The AI module may be on a SIM card inserted into the UE, or part of an internal software implementation. Configuring the AI module can be based on default parameters stored in the UE, or based on signalling received from a network.

6 Claims, 8 Drawing Sheets

(56) References Cited

U.S. PATENT DOCUMENTS

| | | | |
|---|---|---|---|
| 2013/0275346 A1* | 10/2013 | Srikanteswara | H04W 76/10 706/12 |
| 2014/0313908 A1* | 10/2014 | da Silva | H04W 4/70 370/252 |
| 2016/0021173 A1* | 1/2016 | Tapia | H04L 67/125 709/204 |
| 2016/0316513 A1 | 10/2016 | Lee et al. | |
| 2017/0075982 A1* | 3/2017 | Yang | G06K 9/00973 |
| 2017/0264902 A1* | 9/2017 | Ye | G06N 3/0454 |
| 2017/0353260 A1* | 12/2017 | Wang | H04J 3/1694 |
| 2018/0198641 A1* | 7/2018 | Gilani | H04L 63/1425 |
| 2018/0239820 A1* | 8/2018 | Jeong | H04N 21/41407 |
| 2018/0240456 A1* | 8/2018 | Jeong | G10L 15/30 |
| 2018/0268282 A1* | 9/2018 | Zanpure | G06N 3/10 |
| 2018/0338032 A1* | 11/2018 | Baek | H04L 67/22 |
| 2019/0101977 A1* | 4/2019 | Armstrong-Muntner | G06F 3/011 |
| 2019/0132708 A1 | 5/2019 | Belghoul et al. | |
| 2019/0138423 A1* | 5/2019 | Agerstam | H04L 41/0893 |
| 2019/0147340 A1* | 5/2019 | Zhang | G06N 3/082 706/25 |
| 2019/0189120 A1* | 6/2019 | Sohn | G10L 15/22 |
| 2019/0213504 A1* | 7/2019 | Vasseur | H04L 41/16 |
| 2019/0220748 A1* | 7/2019 | Denil | G06N 3/084 |
| 2019/0238202 A1* | 8/2019 | Chavva | H04W 24/08 |
| 2019/0261370 A1* | 8/2019 | Amini | G08B 13/193 |
| 2019/0288877 A1* | 9/2019 | Babbellapati | H04W 88/16 |
| 2019/0342820 A1* | 11/2019 | Chen | H04W 48/02 |
| 2019/0347541 A1* | 11/2019 | Li | G05D 1/0221 |
| 2020/0012923 A1* | 1/2020 | Ghosh | G06K 9/00369 |
| 2020/0077285 A1* | 3/2020 | Yu | H04B 7/0834 |
| 2020/0175835 A1* | 6/2020 | Moon | G08B 27/001 |

\* cited by examiner

SYSTEMS AND METHODS FOR SIGNALING FOR AI USE BY MOBILE STATIONS IN WIRELESS NETWORKS

FIELD

The application relates to the use of artificial intelligence (AI) by mobile stations in wireless networks.

BACKGROUND

Channel state information (CSI) acquisition and feedback at a user equipment (UE) involves channel estimation and sending the channel estimate, or a modified version of the channel estimate, to a base station (BS). Pilot signals (sometimes called "pilots") in the form of CSI-reference signals (CSI-RS) are used by the UE for channel estimation. The UE estimates the channel on CSI-RS ports. CSI-RS ports are mapped to the physical antenna ports at the network using a precoder. This precoder is often implementation specific and blind to the UE.

The Third Generation Partnership Project's (3GPP) Long-Term Evolution (LTE) and fifth generation (5G) New Radio (NR) standards support CSI acquisition using CSI-RS with support for a different number of ports. The density of the CSI-RS is the same for all the ports, and ports in the same configuration are orthogonal in time and/or frequency and/or code space. CSI-RS is selected from a set of possible patterns and is modulated with a scrambled sequence. LTE further allows CSI acquisition using cell specific reference signals (CRS).

In NR, a multi-step CSI-RS allocation is supported. First, a UE acquires wide beam information through measurement of synchronization signal block (SSB) or low resolution CSI-RS and reports to the network. Then, the network allocates a CSI-RS to the UE or group of UEs based on the wide beam information.

CSI-RS ports are mapped to the physical antenna ports at the network using a precoder. This precoder is often implementation specific and blind to the UE.

Channel estimation has conventionally been performed using frequency domain methods and time domain methods based on, for example, minimum mean square error (MMSE), least squares (LS), and the like.

Other existing solutions are based on compressive sensing (CS). These involve the BS sending pilots, such as CSI-RS, to UEs for channel estimation, and the UE transmitting feedback in the form of a compressed version of the (sparse) channel to the BS. The base station recovers the UE channels given the received compressed UE channels.

More recently, machine learning (ML)-based approaches have been proposed for channel estimation. These approaches do not rely on a channel sparsity assumption and can therefore exploit channel structure unlike CS-based approaches, and can be faster (in terms of execution time) than CS-based approaches. See for example C.-K. Wen, W.-T. Shih, and Shi Jin, "Deep learning for massive MIMO CSI feedback," *IEEE Wireless Communications Letters*, 2018 and T. Wang, C. Wen, S. Jin, G. Ye Li, "Deep Learning-based CSI Feedback Approach for Time-varying Massive MIMO Channels," Arxiv:1807.11673v1, July 2018. In these examples, channel estimation by UE is assumed perfect. Because a BS needs to reconstruct the channel (which is available at the UE) based on received feedback from the UE, an autoencoder is used to implement a compression and reconstruction mechanism. For training purposes, a sufficient number of channel samples carrying unlabeled data are used. This is an example of unsupervised learning. In operation, the UE estimates the channel (perfectly or imperfectly), and compresses the estimated channel. The base station reconstructs the UE channel.

There is a desire in the art for improved flexibility in configuring a UE to perform tasks for wireless communications, such as channel estimation.

SUMMARY

According to one aspect of the present disclosure, there is provided a method in a user equipment (UE), the method comprising: configuring an artificial intelligence (AI) module in a UE to perform at least one task for wireless communications; performing the at least one task using the configured AI module.

In some embodiments, the at least one task comprises one or more of: channel estimation; control and/or data signal reception; control and/or data signal demodulation; downlink and/or uplink spatial domain filtering; radio link monitoring; mobility management and reporting; beam management and reporting; channel state information feedback; interference cancellation; equalization.

In some embodiments, the method further comprises: receiving signalling from the network informing the UE of the at least one task the UE is to perform using the configured AI module.

In some embodiments, the method further comprises: receiving signalling from the network with parameters for use in configuring the AI module.

In some embodiments, receiving signalling from the network with parameters to configure the AI module for use in configuring the AI module comprises receiving one or more of: input type and/or output type; size and format; layer configuration; feature map size; format; number of neurons; coefficients of link between neurons of neighboring layers; activation functions.

In some embodiments, the method further comprises: receiving signalling from the network with parameters to configure the AI module for use in configuring the AI module In some embodiments, the method further comprises: activating the AI module upon insertion of a subscriber identity module (SIM) card in the UE; wherein configuring the AI module in the UE to perform at least one task for wireless communications is based on parameters stored in the SIM card.

In some embodiments, the method further comprises: activating the AI module upon insertion of a subscriber identity module (SIM) card in the UE; wherein configuring the AI module in the UE to perform at least one task for wireless communications is based on default parameters stored in a memory of the UE; receiving signalling from a network message carrying AI module configuration parameters for use in configuring the AI module.

In some embodiments, the method further comprises: activating the AI module upon insertion of a subscriber identity module (SIM) card in the UE, wherein the AI module is stored on the SIM card; receiving signalling from a network message carrying AI module configuration parameters for use in configuring the AI module.

In some embodiments, the method further comprises: activating the AI module, wherein the AI module is part of the UE's internal software implementation; wherein configuring the AI module in the UE to perform at least one task for wireless communications is based on default parameters stored in a memory of the UE.

In some embodiments, the method further comprises: activating the AI module, wherein the AI module is part of the UE's internal software implementation; wherein configuring the AI module in the UE to perform at least one task for wireless communications is based on default parameters stored in a memory of the UE; receiving signalling from a network to update the default parameters stored in the memory of the UE.

In some embodiments, the method further comprises: receiving a UE capability enquiry message from a network; responding to the UE capability enquiry with a UE capability response message indicating the UE's AI capability; receiving signalling to configure the UE to perform a given wireless communications task.

In some embodiments, the method further comprises: receiving a UE capability enquiry message from a network; responding to the UE capability enquiry with a UE capability response message indicating the UE's AI capability; receiving signalling to configure the UE to perform a given wireless communications task; receiving signalling containing parameters for the UE to configure its AI module.

According to another aspect of the present invention, there is provided a user equipment (UE) comprising: processor and memory; at least one antenna; an artificial intelligence (AI) module; wherein the AI module is configured to perform at least one task for wireless communications.

In some embodiments, the at least one task comprises one or more of: channel estimation; control and/or data signal reception; control and/or data signal demodulation; downlink and/or uplink spatial domain filtering; radio link monitoring; mobility management and reporting; beam management and reporting; channel state information feedback; interference cancellation; equalization.

In some embodiments, the UE is further configured to: receive signalling from the network informing the UE of the at least one task it is to perform using the configured AI module.

In some embodiments, the UE is further configured to: receive signalling from the network with parameters to configure the AI module for use in configuring the AI module.

In some embodiments, the UE is configured to receive signalling from the network with parameters to configure the AI module for use in configuring the AI module by receiving one or more of: input type and/or output type; size and format; layer configuration; feature map size; format; number of neurons; coefficients of link between neurons of neighboring layers; activation functions.

In some embodiments, the UE is further configured to: receive signaling from the network with parameters to configure the AI module for use in configuring the AI module In some embodiments, the UE further comprises: a subscriber identity module (SIM) card slot; wherein the UE is configured to: activate the AI module upon insertion of a subscriber identity module (SIM) card in the SIM card slot; wherein the AI module is configured to perform at least one task for wireless communications based on parameters stored in the SIM card.

In some embodiments, the UE further comprises: a subscriber identity module (SIM) card slot; wherein the UE is configured to: activate the AI module upon insertion of a subscriber identity module (SIM) card in the UE; wherein the AI module is configured to perform at least one task for wireless communications based on default parameters stored in a memory of the UE; the UE is further configured to receive signaling from a network message carrying AI module configuration parameters for use in configuring the AI module.

In some embodiments, the UE further comprises: a subscriber identity module (SIM) card slot; wherein the UE is configured to: activate the AI module upon insertion of a subscriber identity module (SIM) card in the UE, wherein the AI module is stored on the SIM card; receive signaling from a network message carrying AI module configuration parameters for use in configuring the AI module.

In some embodiments, the UE is further configured to: activate the AI module, wherein the AI module is part of the UE's internal software implementation; wherein the AI module is configured to perform at least one task for wireless communications based on default parameters stored in a memory of the UE.

In some embodiments, the UE is further configured to: activate the AI module, wherein the AI module is part of the UE's internal software implementation; wherein the AI module is configured to perform at least one task for wireless communications based on default parameters stored in a memory of the UE; wherein the UE is further configured to receive signaling from a network to update the default parameters stored in the memory of the UE.

In some embodiments, the UE is further configured to: receive a UE capability enquiry message from a network; respond to the UE capability enquiry with a UE capability response message indicating the UE's AI capability; receive signaling to configure the UE to perform a given wireless communications task.

In some embodiments, the UE is further configured to: receive a UE capability enquiry message from a network; respond to the UE capability enquiry with a UE capability response message indicating the UE's AI capability; receive signaling to configure the UE to perform a given wireless communications task; receiving signaling containing parameters for the UE to configure its AI module.

BRIEF DESCRIPTION OF THE DRAWINGS

Embodiments of the disclosure will now be described with reference to the attached drawings in which.

DETAILED DESCRIPTION

Figure 1:
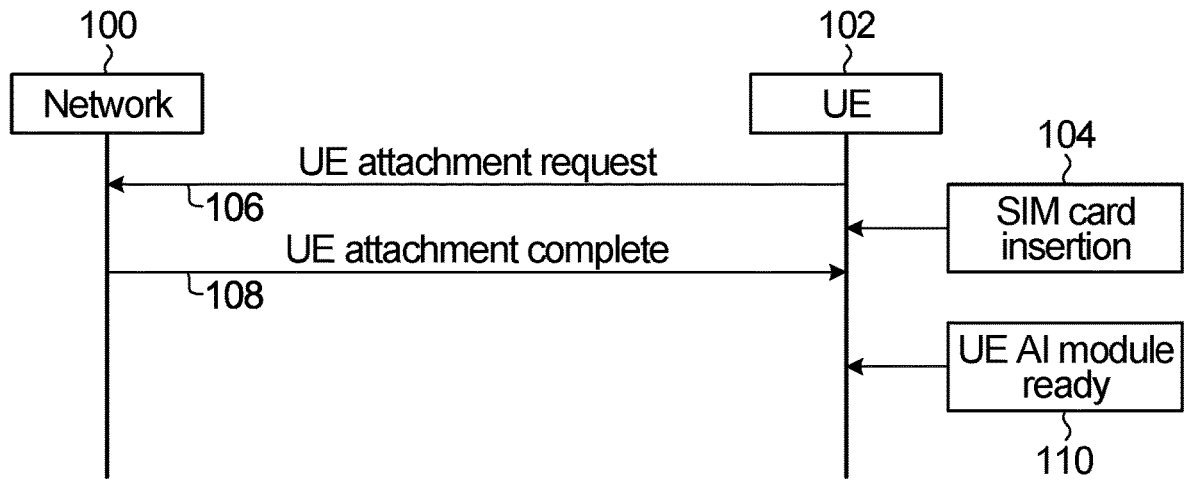
FIG. 1 is a call flow diagram of a method according to embodiments wherein AI module activation is based on SIM card insertion without network involvement.

Artificial Intelligence, in particular Machine Learning, is an emerging and fast-growing field thanks to the advances made in the field of Computer Architecture and in particular: General Purpose Graphics Processing Units (GP-GPUs). As an example: deep Convolutional Neural Networks have gained a lot of traction thanks to their ability to find patterns in data with intrinsic structure through the use of convolutional filters. The application of Artificial Intelligence to the field of communications is largely unexplored and may help outperform existing solutions or help reshape wireless networks conceptually. Throughout this disclosure, reference is made to AI modules as blocks based on some implementation of artificial intelligence mechanisms (for instance: heuristics, support vector machines, neural networks, convolutional neural networks, etc.) in software, hardware or some combination of both.

Embodiments of the disclosure provide improved flexibility in configuring a UE to perform tasks for wireless communications, such as channel estimation, through the use of AI modules located at the UE side. Some embodiments provide wireless network with signaling mechanisms in order to configure AI modules located at the UE side. An objective of such embodiments is to provide the network with signaling mechanisms to configure a UE in a network-controlled manner for communication purposes. This applies to tasks necessary for communication purposes in a wireless network, such as: channel estimation, control and/or data signal reception, control and/or data signal demodulation, downlink and/or uplink spatial domain filtering (more commonly referred to as beamforming), radio link monitoring, mobility management and reporting, beam management and reporting, channel state information feedback, interference cancellation, equalization, etc. The signaling specifies the tasks which are to be performed by the UE using Artificial Intelligence mechanisms (e.g. Machine Learning, Reinforcement Learning).

Some of the embodiments described below use higher-layer signaling. A specific example that can be used for any such embodiment is radio resource control (RRC) signaling. Some of the embodiments described below use semi-static signaling. A specific example that can be used for any such embodiment is a medium access control-control entity (MAC-CE) command. Some of the embodiments described below use dynamic signaling. A specific example that can be used for any such embodiment is downlink control information (DCI).

The network can be configured with signaling mechanisms to configure a UE's AI module for performing a given task for wireless communications. The signaling mechanism allows the network to configure the UE's behavior through its AI module. Configuring the AI module entails configuring the task or tasks it carries out and its internal structure (e.g. input/output type, size and format; layer configuration; feature map size and format). In some embodiments, the network can (re)configure a UE's AI module on the fly. This allows the network to customize each UE's behavior and its hardware and provides a signaling framework to achieve such customization of UE behaviour.

In all of the following embodiments, the AI module can be implemented in software, hardware or a combination of both. The paradigms upon which the AI modules are built on (e.g. neural networks, support vector machines, Markov Decision Processes, Q-tables) are left to implementation. The type of task that the UE's AI module can perform can be one of (but not limited to): channel estimation, data demodulation, channel compression, interference cancellation, equalization, beam failure detection. The type of task that the network's AI module can perform can be one of (but not limited to): channel reconstruction, radio resource allocation, traffic offloading, RS port design, UE categorization. The signaling mechanisms specify the tasks for which the UE uses Artificial Intelligence and provide all the necessary parameters to configure the AI modules.

Various specific embodiments will now be described with reference to FIGS. 1 to 7. Each of these Figures shows a set of interactions between a network 100 and a UE 102. Although these elements are identically numbered in the Figures for brevity, it should be understood that the functionality of the network 100 and UE 102 may be different for different embodiments, as will be described.

Embodiment 1: AI Module Activation Based on SIM Card Insertion—No Network Involvement In this embodiment, the UE has an AI module that is activated upon insertion of a subscriber identity module (SIM) card in the UE. The network may or may not have an AI module. The SIM card can be an existing type of SIM card (e.g. Micro SIM, Nano SIM) or some new type of SIM card (e.g. AI SIM). After the UE has completed its access to the wireless network and has been authenticated by the carrier, the UE uses configuration parameters supplied from the SIM card to configure its AI module for a given task.

In this embodiment, each carrier can supply its own configuration for AI-capable UEs through the SIM card. The UE determines whether and how to activate its AI module based on information or configuration parameters supplied in the SIM card.

In some embodiments, the carrier supplies a specifically configured SIM card, referred to here as a config-AI-SIM, containing AI module configuration parameters. Then upon the UE being turned on, the UE uses the parameters provided by the carrier as part of the SIM card to configure and activate its AI module.

Alternatively, an existing type of SIM may be used, upon which AI module configuration parameters are stored in a manner accessible to the UE. In this case, when the UE is turned on, the UE checks if any parameters are provided on the SIM card for AI module configuration purposes. If yes, then the UE uses those parameters to configure and activate its AI module. If not, then the UE does not activate its AI module.

In some embodiments, if no SIM card is inserted, then upon turning the UE on, the UE does not activate its AI module.

In this embodiment, the UE can use its AI module for communication purposes simply upon insertion of a SIM card in the UE. This embodiment does not require any new signaling mechanisms because the network does not interact with the UE's AI module. The UE simply configures its AI module using parameters that were provided by the UE manufacturer via the SIM card. The technical benefit of this embodiment is that it allows AI-capable UEs to be accommodated into the network without any extra knowledge or dedicated mechanism at the network side.

An example is shown in FIG. 1. Here, upon insertion of the SIM card at 104, the UE 102 sends a UE attachment request 106 to the network 102. The network 100 responds at 108 to complete the UE attachment. The UE AI module is ready at 110, having been configured based on information stored on the SIM card.

Embodiment 2: AI Module Activation Based on SIM Card Insertion—Some Network Involvement In this embodiment, the UE has an AI module that is activated upon insertion of a SIM card in the UE. The network may or may not have an AI module. The SIM card can be an existing type of SIM card (e.g. Micro SIM, Nano SIM) or some new type of SIM card. After the UE has completed its access to the wireless network and has been authenticated by the carrier, the network sends configuration parameters as part of signaling to the UE to configure its AI module for a given task. The signaling can be a push messaging mechanism where the message carries information to configure the UE's AI module.

In this embodiment, the UE can use its AI module for communication purposes simply upon insertion of a SIM card in the UE and the network can interact with the UE's AI module by sending configuration parameters after the UE has been authenticated. This solution may require a new signaling mechanism for the provision of configuration parameters by the network to the UE's AI module. The UE then configures its AI module using parameters that were provided by the network. A technical advantage of this solution over the previously described Embodiment 1 is that the network can define the behavior to be adopted by the UE's AI module using configuration parameters transmitted over the air, rather than preconfiguring them on the SIM.

Figure 2:
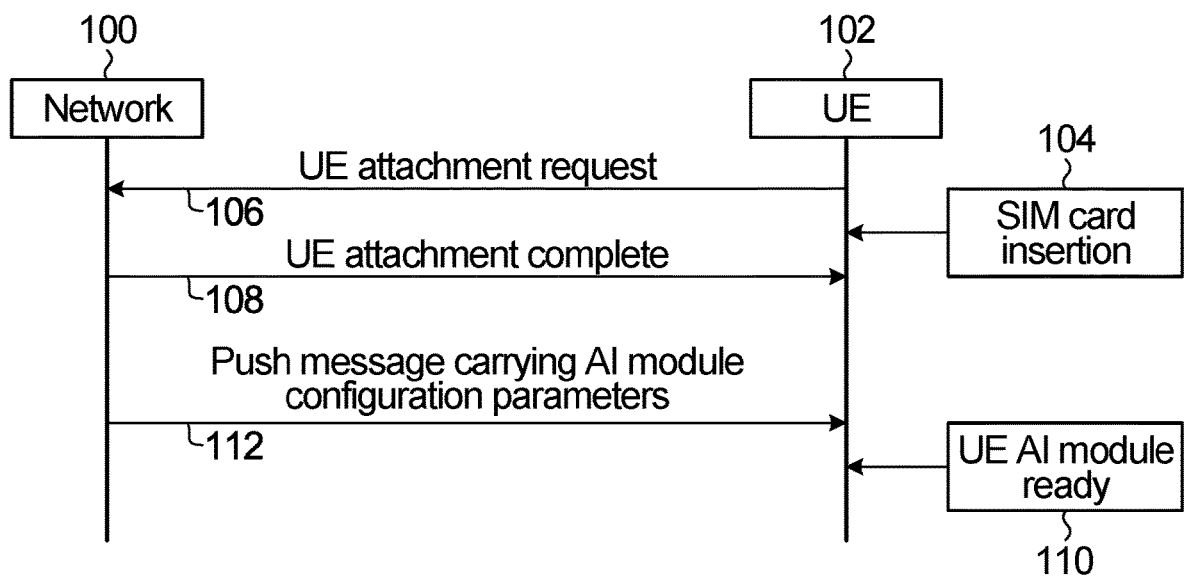
FIG. 2 is a call flow diagram of a method according to embodiments wherein AI module activation is based on SIM card insertion with network involvement.

An example is shown in FIG. 2. Here, upon insertion of the SIM card at 104, the UE 102 sends a UE attachment request 106 to the network 100. The network 100 responds at 108 to complete the UE attachment. The network transmits a push message carrying AI module configuration parameters at 112. UE AI module is ready at 110, having been configured based on configuration parameters received from the network at 112.

Embodiment 3—AI Module on SIM Card

In this embodiment, the UE has a SIM card that includes an AI module (for instance: built-in as part of the SIM chip). After the UE has completed its access to the wireless network and has been authenticated by the carrier, the network sends configuration parameters (for instance as part of a push mechanism) to the UE to configure its AI module for a given task.

Figure 3:
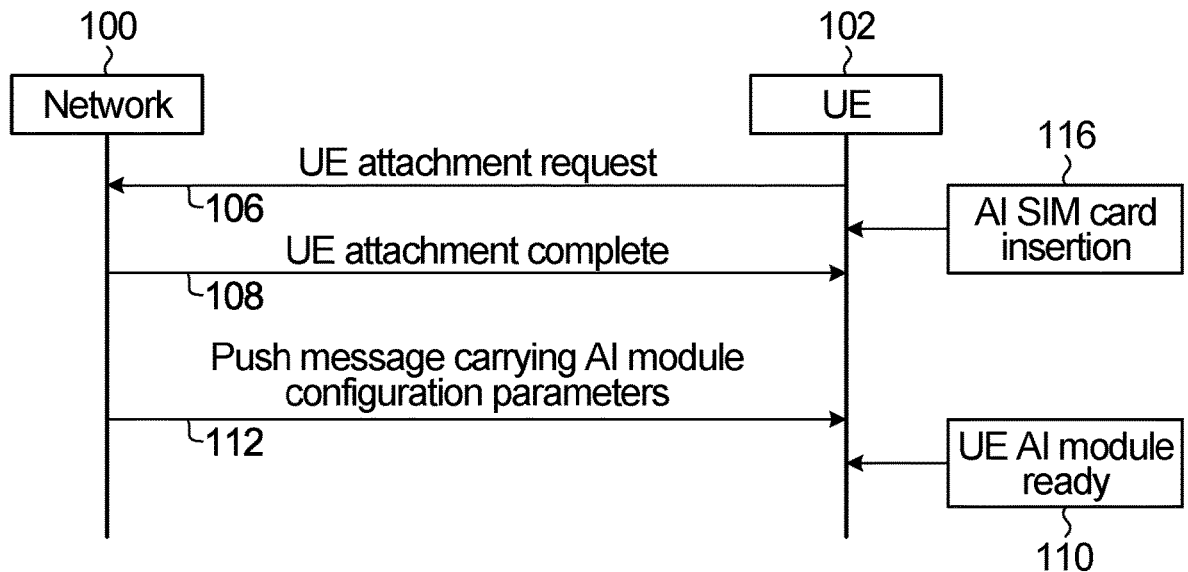
FIG. 3 is a call flow diagram of a method according to embodiments wherein an AI module is included on a SIM card.

An example is shown in FIG. 3. Here, upon insertion of a SIM card 116 with AI module implemented thereon, the UE 102 sends a UE attachment request 106 to the network 100. The network 100 responds at 108 to complete the UE attachment. At 112, the network transmits a push message carrying AI module configuration parameters to the UE, and the UE AI module is ready at 110, having been configured based on configuration parameters received from the network at 112.

In this embodiment, the UE can use the AI module on the SIM card for communication purposes simply upon insertion of the SIM card in the UE and the network can interact with the SIM card's AI module by sending configuration parameters after the UE has been authenticated. This solution employs a signaling mechanism for the provision of configuration parameters by the network to the SIM card's AI module, and employs interfaces and inputs and outputs between the UE and the AI module on the SIM card. The UE then configures its AI module using parameters that were provided by the network. A technical advantage of this solution over Embodiment 2 is that the AI module is portable and does not require the UE to have hardware and software to support and run the AI module.

Embodiment 4—AI Module Operated as Part of UE Internal Software Implementation; No Network Input In this embodiment, the UE has an AI module that is operated as part of the UE's internal software implementation controlling its hardware, such as an operating system (e.g. iOS, Android, Tizen, etc.) or a firmware (e.g. provided as part of the chipset or the wireless modem or both). After the UE has been powered on, its AI module can be activated as part of the tasks its operating system or firmware performs (e.g. memory management, task scheduling, setting up input/output interfaces with the hardware, driver loading, etc.). The UE uses default parameters stored in its internal memory to configure its AI module for a given task.

Figure 4:
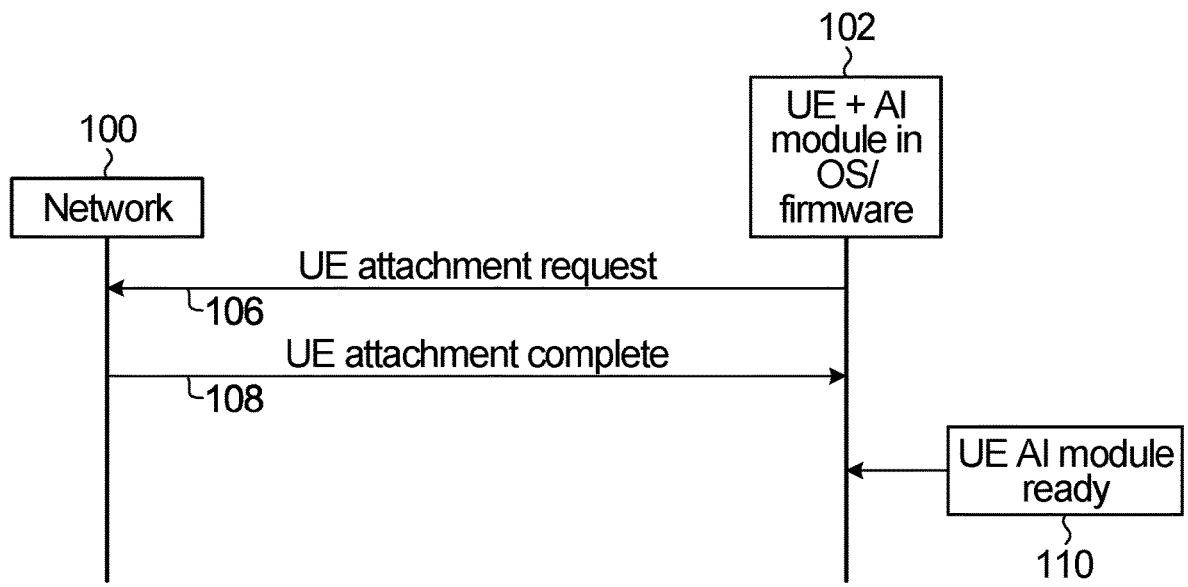
FIG. 4 is a call flow diagram of a method according to embodiments wherein an AI module is operated as a part of UE internal software without network input.

An example is shown in FIG. 4. Here, a network 100 is interacting with a UE 102 that has an AI module in its operating system/firmware. The UE 102 sends a UE attachment request 106 to the network 100. The network 100 responds at 108 to complete the UE attachment. The UE AI module is ready at 110, having been configured based on the default parameters.

In this embodiment, the UE can use its AI module for communication purposes based on software implementation written specifically for the purpose of operating the AI module. This solution does not require any new signaling mechanism as the network does not interact with the UE's AI module. The UE simply configures its AI module using parameters that were provided by the UE's internal operating system or firmware implementation. Whatever task(s), input(s) and output(s) the AI module is supposed to use are driven by the UE's internal software. The technical benefits of this embodiment over existing solutions are that the AI module is incorporated as part of the UE's internal software (i.e. OS, modem firmware) and that it allows AI-capable UEs to be accommodated in the network without any extra knowledge or dedicated signaling mechanism at the network side.

Embodiment 5—AI Module Operated as Part of UE Internal Software Implementation; Network Input In this embodiment, the UE has an AI module that is operated as part of the UE's internal software implementation controlling its hardware, such as an operating system (e.g. iOS, Android, Tizen, etc.) or a firmware (e.g. provided as part of the chipset or modem). After the UE has been powered on, its AI module can be activated as part of the tasks its operating system or firmware performs. The UE uses default parameters stored in its internal memory to configure its AI module for a given task. The network or the carrier may update the default parameters stored in the UE's internal memory using system or firmware updates.

Figure 5:
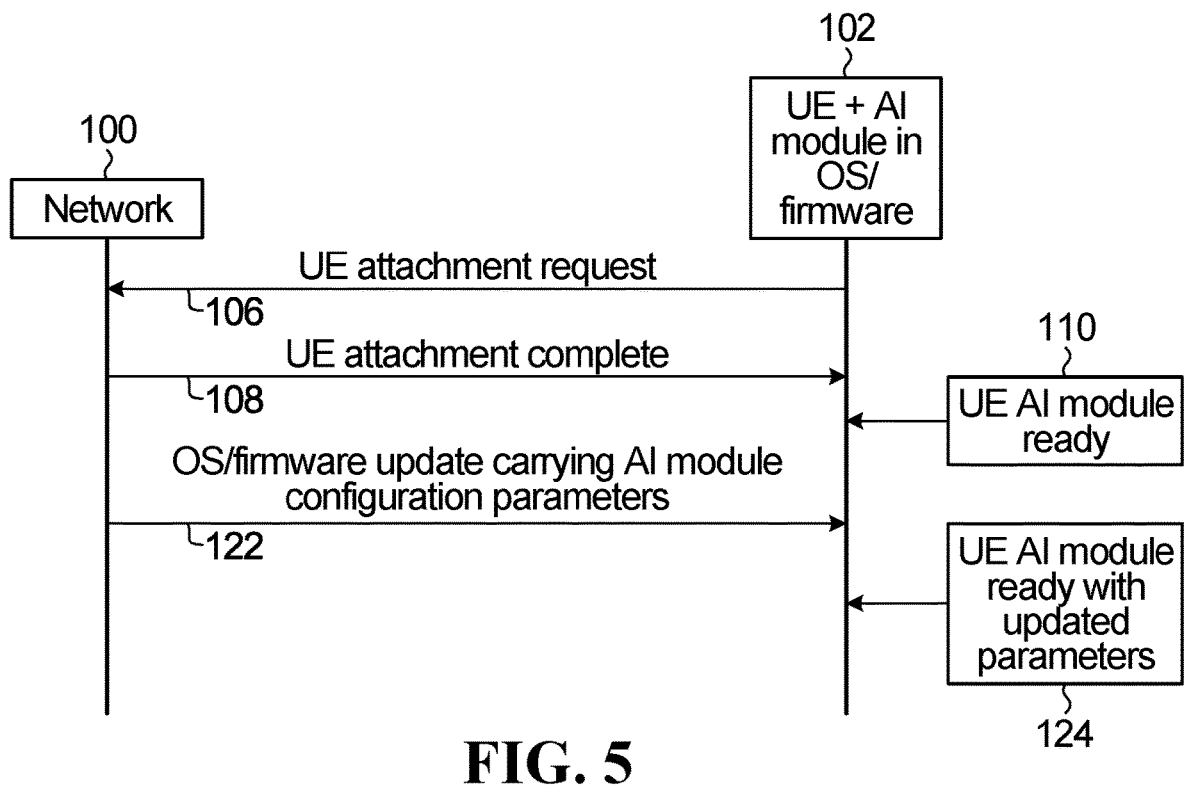
FIG. 5 is a call flow diagram of a method according to embodiments wherein an AI module is operated as a part of UE internal software with network input.

An example is shown in FIG. 5. Here, a network 100 is interacting with a UE 102 that has an AI module in its operating system/firmware. The UE 102 sends a UE attachment request 106 to the network 100. The network 100 responds at 108 to complete the UE attachment. The UE AI module is ready at 110, having been configured based on the default parameters. Later, the network updates the AI module configuration parameters by sending an OS/firmware update at 122. The UE AI module is again ready at 124, having been configured based on the updated parameters.

In this embodiment, the UE can use its AI module for communication purposes based on software implementation written specifically for the purpose of operating the AI module. This solution may require a new signaling mechanism as the network can interact with the UE's AI module through system or firmware updates. The UE simply configures its AI module using parameters that are supplied by the UE's internal software implementation. The technical benefits of this embodiment over Embodiment 4 are that the network or the carrier operating the network can configure the UE's AI module using OS/firmware updates.

Embodiment 6—Network UE Capability Inquiry to Learn UE's AI Features and Capability; Parameters to Configure AI Module not Provided by Network With this embodiment, the UE has an AI module that the network is made aware of as part of the UE's features and capability. The network sends a UE capability inquiry message (for instance, as part of the UE completing its attachment procedure). The AI-capable UE responds to the network with a UE capability response message indicating its AI capability for communication purposes. Once the network is informed of the UE's AI capability, the network configures the UE to perform a given task (e.g. channel estimation, data reception, data demodulation, channel state information feedback, interference cancellation, etc.) through some form of signaling (e.g. higher layer signaling, dynamic signaling, a hybrid form between higher layer and dynamic signaling, a brand new form of signaling, some combination of the above).

Figure 6:
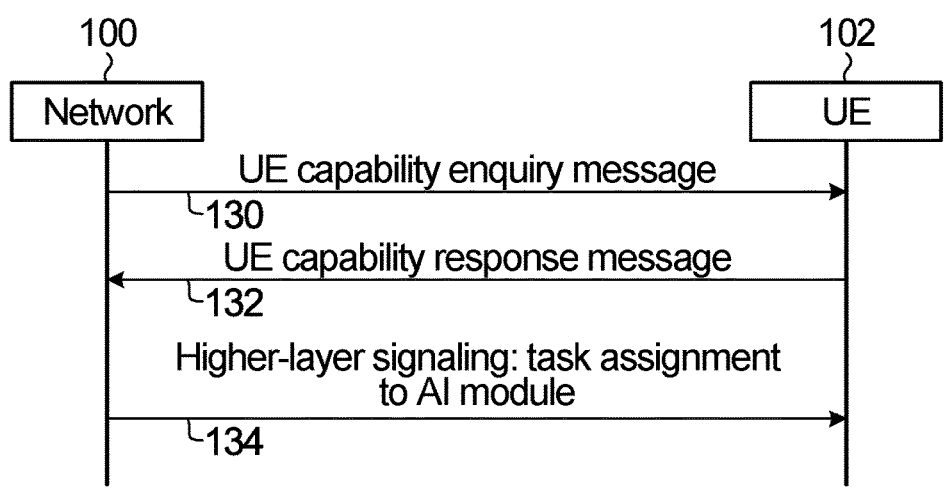
FIG. 6 is a call flow diagram of a method according to embodiments wherein a system conducts an AI inquiry to learn a UE's AI capability where parameters to configure the AI module are not provided by a network.

An example is shown in FIG. 6. Here, the network 100 sends a UE capability inquiry 130 to the UE 102. The UE 102 responds with a UE capability response message at 132. Following this, in the situation where the UE 102 has the required AI capability as indicated in the UE capability response message 132, the network sends higher layer signalling at 134 containing task assignment to the AI module.

The signaling between the network and the UE entails at least the task and configuration parameters for the UE's AI module. As an example: the network can use higher-layer signaling to configure objects that define which task(s) (e.g. channel estimation, data reception, data demodulation, channel state information feedback, interference cancellation, etc.) the UE is expected to perform using its AI module. The tasks may be defined using dedicated higher-layer signaling objects or using a set of dedicated parameters. Each object carries parameters relevant to the configuration of the AI module's internal structure, such as: input data type and format; output type and format; number of layers between input layer and output layer.

In this embodiment, the UE can use its AI module for communication purposes based on what the network instructs the UE to do. This solution requires a signaling mechanism as the network interacts with the UE's AI module by transmitting signaling messages to the UE. The UE simply configures its AI module based on the processing task the network instructed it to do. Parameters the UE uses to configure its AI module are not supplied; therefore those are left up to the UE's implementation. The technical benefit of this embodiment over existing solutions is that the UE's AI module behavior can be controlled by the network using signaling mechanism.

Embodiment 7—Network UE Capability Inquiry to Learn UE's AI Features and Capability; Parameters to Configure AI Module Provided by Network With this embodiment, the UE has an AI module that the network is made aware of as part of the UE's features and capability. The network has an AI module that the network can use in order to emulate UE behavior and any corresponding task the UE performs. The network sends a UE capability inquiry message (for instance, as part of the UE completing its attachment procedure). The UE responds to the network with a UE capability response message indicating its AI capability for communication purposes. Once the network is informed of the UE's AI capability, the network configures the UE to perform a given task (e.g. channel estimation, data reception, data demodulation, channel state information feedback, interference cancellation, etc.) through some form of signaling (e.g. higher layer signaling, dynamic signaling, a hybrid form between higher layer and dynamic signaling, a brand new form of signaling, some combination of the above). The network also provides the UE with parameters to configure its AI module.

Figure 7:
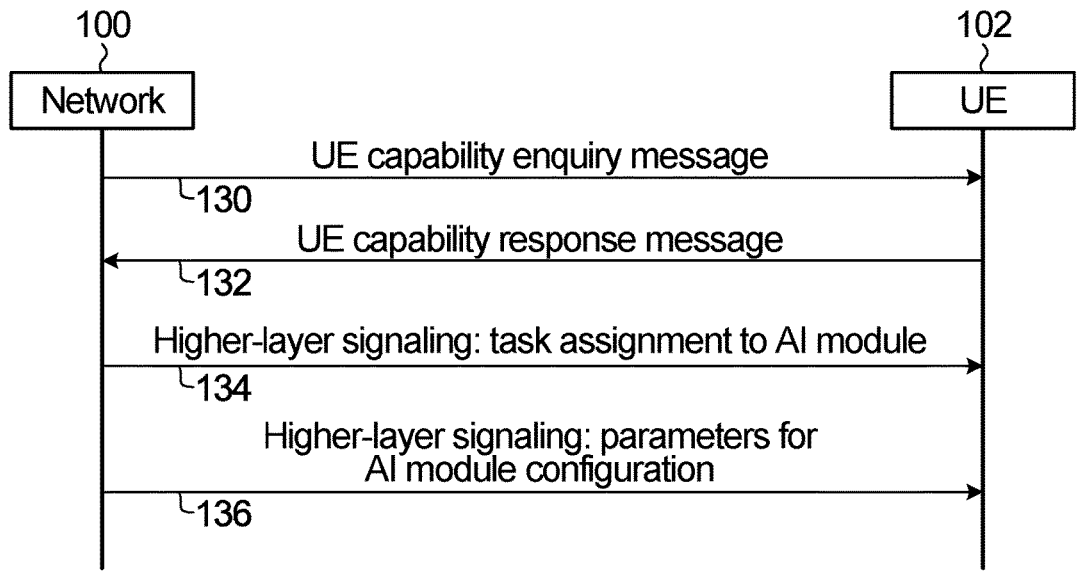
FIG. 7 is a call flow diagram of a method according to embodiments wherein a system conducts an AI inquiry to learn a UE's AI capability where parameters to configure the AI module are provided by a network.

An example is shown in FIG. 7. Here, the network 100 sends a UE capability inquiry 130 to the UE 102. The UE 102 responds with a UE capability response message at 132. Following this, in the situation where the UE has the required AI capabilities, the network sends higher layer signalling at 134 containing task assignment to the AI module. At 136, the network sends higher-layer signaling containing parameters for AI module configuration.

The signaling between the network and the UE entails at least the task and configuration parameters for the UE's AI module. As an example: the network can use higher-layer signaling to configure objects that define which task(s) (e.g. channel estimation, data reception, data demodulation, channel state information feedback, interference cancellation, etc.) the UE is expected to perform using its AI module. The tasks may be defined using dedicated higher-layer signaling objects or using a set of dedicated parameters. Each object carries parameters relevant to the configuration of the AI module's internal structure, such as: input data type, size and format; output type, size and format; number of layers between input layer and output layer.

In this embodiment, the UE can use its AI module for communication purposes based on what the network instructs the UE to do. This solution requires a signaling mechanism as the network interacts with the UE's AI module by transmitting signaling messages to the UE. The UE configures its AI module based on the processing task the network instructed it to do and the parameters the network provided the UE with. This allows the network to have greater control over the UE's behavior. The technical benefits of this embodiment over Embodiment 6 are that the UE's AI module behavior can be controlled by the network using signaling mechanism. Another benefit of this embodiment is that the network can perform offline training for a given task and configure a UE's AI module with the results of that training.

Embodiment 8—Network-Side Machine Learning
for CSI-Port Definition and
Configuration—Standardized Signalling In this embodiment, the network's AI module is a neural network (NN). The NN can be a convolutional NN, a deep convolutional NN, or some other type of NN. Machine Learning (e.g. Unsupervised Learning; Reinforcement Learning) is applied to the problem of CSI-RS ports definition and configuration.

The network side is equipped with one or more NNs. The network uses information such as deployment map, UE location, line-of-sight direction, CSI reports carrying beam information based on RSs such as CSI-RS or SSBs, as inputs to train its NNs for the purpose of determining the most suitable configuration of CSI-RS ports for a given UE or a given group of UEs. One or more of the above information is used as input data to one or more neural networks. As a first example: the network can use one neural network for each input data type, i.e. one for the deployment map, one for UE location, etc. As a second example: the network can use one neural network to which all of the above information is supplied as one large multi-dimensional input data vector. The neural network(s) extract feature maps from the input data and the training process can be done either online or offline. The input data may be supplied sequentially, or in a batch. The output of the neural network is the CSI-RS port configuration determined to be the most likely to be optimal for a given UE.

CSI-RS port definition is signaled to the UE, optionally using an existing technical standard signaling solution. As an example: the NR standard gives the CSI-RS port configuration through parameters such as the number of antenna ports, resource mapping, resource periodicity and offset, quasi-coloration assumption table, power control assumption, scrambling identities. Based on the output of the neural network(s), the network transmits CSI-RS port configuration to the UE using higher-layer signaling, semi-static signaling, dynamic signaling or some combination of the three.

In this embodiment, the network trains its NNs such that the output of the NNs determines the relevant CSI-RS ports to configure for a given UE or a given group of UEs based on information with stable long-term properties that the network receives from the UEs Information with stable long-term properties, which can be the deployment map, the surrounding environment and long-term channel statistics. The technical benefit is a potentially significant reduction in uplink feedback overhead and CSI-RS configuration complexity at the UE side. For each CSI-RS port configured to a UE or group of UEs, the UE or group of UEs performs a measurement on the port and sends a CSI report to the network. In this embodiment, instead of configuring all available CSI-RS ports for a UE or a group of UEs, the network configures only those ports that the NNs deem likely to be useful for communicating with the UE or group of UEs. The UE or group of UEs can then send to the network CSI reports based on instantaneous channel conditions, with which the network performs its scheduling tasks such as resource allocation and link adaptation. In this embodiment, there is no change to the signaling of current technologies, and the use of neural networks at the network side is completely transparent to the UE and to the technology being used by that network (e.g. LTE, NR).

Embodiment 9—Network-Side Machine Learning
for CSI-Port Definition and
Configuration—Non-Standardized Signalling In this embodiment, the network's AI module is a neural network (NN). The NN can be a convolutional NN, a deep convolutional NN, or some other type of NN. Machine learning (e.g. Unsupervised Learning; Reinforcement Learning) is applied to the problem of CSI-RS ports definition and configuration.

The network side is equipped with one or more NNs. The network uses information such as deployment map, UE location, line-of-sight direction, CSI reports carrying beam information based on RSs such as CSI-RS or SSBs, as inputs to train its NNs for the purpose of determining the most suitable configuration of CSI-RS ports for a given UE or a given group of UEs. One or more of the above information is used as input data to one or more neural networks. As a first example: the network can use one neural network for each input data type, i.e. one for the deployment map, one for UE location, etc. As a second example: the network can use one neural network to which all of the above information is supplied as one large multi-dimensional input data vector. The neural network(s) extract feature maps from the input data and the training process can be done either online (where input data is supplied sequentially) or offline (where input data is supplied in one batch). The output of the neural network is the CSI-RS port configuration determined to be the most likely to be optimal for a given UE.

CSI-RS port definition is signaled to the UE using signaling mechanisms that differ from existing technical standards. As an example: the neural network outputs the CSI-RS port configuration using parameters that are based on the internal feature maps the neural network derives. These feature maps may correspond to already known parameters such as the number of antenna ports, resource mapping, resource periodicity and offset, quasi-colocation assumption table, power control assumption, scrambling identities, etc. The network transmits the resulting CSI-RS port configuration to the UE using higher-layer signaling, semi-static signaling, dynamic signaling or some combination of the three.

In this embodiment, the network trains its NNs such that the output(s) of the NNs determines the relevant CSI-RS ports to configure for a given UE or a given group of UEs based on information with stable long-term properties that the network receives from the UEs. Information with stable long-term properties can be the deployment map, the surrounding environment and long-term channel statistics. On top of having the technical benefit that Embodiment 8 has, Embodiment 9 has the additional technical benefit of providing the network with the flexibility to use any kind of port definition, i.e. the network is no longer bound to any kind of existing technical standard when it comes to defining antenna ports. All the network needs is a signaling framework which allows it to capture the entirety of the CSI-RS port design (for the case of channel state information feedback) and signal that to the UE or group of UEs. The signaling transmitted by the network may be partly based on existing standard solutions and partly based on the output of the feature maps generated by the neural network(s) used at the network side.

Embodiment 10—Network-Side Machine Learning
for CSI-Port Definition and Configuration Used to
Configure UE Side AI Module In this embodiment, both the network's AI module and the UE's AI module are neural networks (NN). The NN can be a convolutional NN, a deep convolutional NN, or some other type of NN. We focus on the usage of Machine Learning (e.g. Unsupervised Learning; Reinforcement Learning) applied to the problem of CSI-RS ports definition and configuration.

The network side is equipped with one or more NNs. The network uses information such as deployment map, UE location, line-of-sight direction, CSI reports carrying beam information based on RSs such as CSI-RS or SSBs, as inputs to train its NNs for the purpose of determining the most suitable configuration of CSI-RS ports for a given UE or a given group of UEs. One or more of the above information is used as input data to one or more neural networks. As a first example: the network can use one neural network for each input data type, i.e. one for the deployment map, one for UE location, etc. As a second example: the network can use one neural network to which all of the above information is supplied as one large multi-dimensional input data vector. The neural network(s) extract feature maps from the input data and the training process can be done either online (where input data is supplied sequentially) or offline (where input data is supplied in one batch). The output of the neural network is the CSI-RS port configuration determined to be the most likely to be optimal for a given UE.

CSI-RS port definition is signaled indirectly to the UE by configuring the UE's internal NN structure. As a first example: the neural network outputs the CSI-RS port configuration using parameters that are based on the internal feature maps the neural network derives, and the network transmits signaling carrying parameters corresponding to the feature maps generated at the network side. As a second example: the network may train a generic auto-encoder system based on the information outlined above (deployment map, UE location, line-of-sight direction, channel matrices) in order to determine the optimal CSI-RS port configuration for a given UE. The network then signals relevant parameters to configure the structure of the NN UE with the structure of the NN and the coefficients of the link between neurons of neighboring layers to the UE.

In this embodiment, the network trains its NNs such that the output of the NNs determines the relevant CSI-RS ports to configure for a given UE or a given group of UEs based on information with stable long-term properties that the network receives from the UEs. Information with stable long-term properties can be the deployment map, the surrounding environment and long-term channel statistics. On top of having the technical benefits that Embodiment 9 has, Embodiment 10 has the additional technical benefit of providing the network with the flexibility to configure NNs at the UE side for purposes such as channel estimation and channel compression. The UE's behavior is fully dictated by the network using NNs with assigned parameters.

In massive multiple input multiple output (m-MIMO), the overhead associated with CSI acquisition is significant, both in terms of transmission resources and computation resources. CSI-RS overhead is linearly proportional to the number of ports. UE channel estimation complexity is linearly proportional to the number of ports. UE compression complexity increases (often faster than linearly) with the number of ports. Feedback overhead increases with the number of ports.

With this embodiment, an AI-based algorithm to perform CSI-RS port design is designed at the network side, with any necessary training performed on the network side. Then, once the AI configuration is complete, based on the training, parameters are transmitted to the UE to configure a neural network (or other machine learning capability in the UE) to perform port design on its own. The UE will then run the NN to select the ports to measure, will perform channel estimation on those ports, and will feedback to the network accordingly. This allows for a generic auto-encoder type system where two NNs (one in each side) jointly work to help the UE estimate the channel. The NN configuration on the UE side may be updated from time to time. A detailed example is described below. The NN at the UE side performs the channel compression task. The network will update the UE's NN based on channel conditions/path loss/fast fading/ angles of arrival experienced by the UE. A combination of these would mean that the representation of the channel would change and the network can update how the UE does the channel compression task.

With this embodiment, the UE behavior is fully dictated by the network using assigned NNs. This can be in the form of, for example, number of layers, number of neurons, coefficients of the link between neurons of neighboring layers, and activation functions.

In some embodiments, the UE transmits additional feedback, on top of channel estimation. As an example: the network's NN may configure the UE to transmit feedback about the angles of arrival from which the UE detects the highest amount of energy. The network's NN can then use the information about the angles of arrival in order to determine the CSI-RS resource allocation that is optimal for that UE based on the angles of arrival.

In such embodiments, the network performs channel reconstruction based on the channel report by the UE using the dictated UE measurement in combination with the additional feedback. In some embodiments, channel reconstruction is based on another NN. With this embodiment, signaling is used to configure the UE NN (or in general UE behavior) for channel estimation and feedback report.

In some embodiments, the NN training and configuration is performed offline utilizing data only gathered in the past or through simulation. In other embodiments, in addition or alternatively, online training is performed, which utilizes newly gathered data to enhance the performance. The online training can use supervised and/or unsupervised or reinforcement learning. NNs using supervised forms of learning are based on input data with certain labels which the NN uses in order to learn how to map the input data to a given label. NNs using unsupervised forms of learning are based on input data that is not labeled, which forces the NN to look for patterns and other forms of correlation within the input data. Reinforcement Learning consists of determining a policy the network uses in order to interact with its environment. Some examples of policies the network can use are: which UEs the network serves, how to allocate radio resources, when to turn off base stations, when to instruct UEs to perform handovers, what resources UEs should perform measurements on for mobility/channel state information/beam management/radio link monitoring, etc.).

The mapping of the CSI-RS ports to physical antenna ports can be changed dynamically as no signaling is involved. Other aspects of parameters may be updated with a slower pace as signaling is involved, for example through RRC.

Embodiment 11—AI Modules Used for Channel Compression and Channel Reconstructions This embodiment concerns the problem of CSI acquisition and feedback, with the objective of reducing CSI feedback rate by compressing CSI in a way that the BS still is able to reconstruct CSI. In this embodiment, the network's AI module and the UE's AI module is a neural network (NN). The NN can be a convolutional NN, a deep convolutional NN, or some other type of NN. Machine Learning is applied to the problem of channel compression (at the UE) and channel reconstruction (at the BS).

A NN, which includes layers to be installed at the UE (UE side NN) as well as layers to be installed at the network (network side NN) is trained for the purpose of channel compression and channel reconstruction. For the purpose of training, such a NN uses a signal received by UE corresponding to a known pilot signal transmitted by the network. Based on this, the NN is trained for the purpose of determining a set of codewords allowing the UE to represent a UE's downlink channel as well as allowing the network to reconstruct the UE's downlink channel from a received codeword. The above training process happens in an offline manner. The input to the NN is the received signal at the UE corresponding to a transmitted pilot signal from the BS and the output of the NN is the estimated UE channel corresponding to the pilot. The architecture of the NN is similar to an autoencoder with the difference that the input is the received noisy pilot rather than the estimated channel. The NN architecture includes encoding layers to compress a received signal corresponding to a transmitted pilot to a compressed signal called a codeword. The NN architecture also includes decoding layers to reconstruct the downlink channel from the codeword. The codewords are obtained through the process of training the NN. The training process can happen at any location where training data are gathered and does not have to be the network side. The codewords are defined by a set of constraints if there are any, such as the codeword size and the cardinality of the codebook. The NN also uses a loss function for the purpose of minimizing the error between the original downlink channel and the reconstructed downlink channel. Once the NN is trained, the encoding layers are signaled to UE to be used as the UE side NN. The decoding layers are used as the network side NN. The UE compresses the channel using its NN and sends back the corresponding codeword to the network side, which the network uses to reconstruct the downlink channel seen by the UE using its NN.

The embodiment described above covers a scenario where a UE compresses the observed signal corresponding to CSI-RS directly to a codeword and the network reconstructs the downlink channel corresponding to the CSI-RS from the codeword. So, in a multi-user setting, there is one NN at network side for each UE in the network. Another alternative implementation scenario is that there is one single NN at network side to reconstruct downlink channels corresponding to different UEs from their codewords. In such a scenario, the original NN (the one with encoding and decoding layers) is trained using received CSI-RSs corresponding to multiple UEs and the corresponding downlink channels. Multiple sets of encoding layers, corresponding to multiple UEs, are signaled to UEs and used by them to map their received CSI-RS to an appropriate codeword; and one single decoding layer is used by the network for reconstructing downlink channels for all UEs based on the received codewords from UEs.

The encoding part and the decoding part are handled at the UE and at the network side respectively. The UE is signaled with all the information necessary to configure its NN such that it can perform the encoding part (e.g. using higher-layer signaling, dynamic signaling, hybrid signaling, a combination of the above).

As an example: the UE's NN can be configured using one or more objects defined by higher-layer signaling. The one or more objects configure the behavior the UE should adopt while performing channel compression. The higher-layer signaling object will carry parameters relevant for the configuration of a NN, e.g. the number of layers, the type of each layer (convolutional, fully connected), the number of neurons in each layer, the coefficients of the link between neurons of neighboring layers.

In this embodiment, the network trains its NNs such that it matches the input and the output as closely as possible by learning salient properties of the downlink channel (e.g. angles of departure and arrival, spatial correlations between antenna ports, temporal correlations). Some of the technical advantages of this embodiment are that: it can directly work with received pilot signals to derive a codeword; the UE is directly configured with encoding functions trained offline at the network side; this helps reduce uplink feedback overhead in terms of bits transmitted by having the UE use more compact channel representations and reduce the frequency at which pilot signals are transmitted.

An example of the training process will now be described with reference to FIG. 8.

For training a NN 200, a training set is composed of received pilots (e.g. CSI-RS) which is received at 201. The corresponding downlink channels (obtained through channel estimation using received noisy CSI-RS) are also received at 214. The received pilots are labeled with the corresponding downlink channel estimates. This is an example of supervised learning. The NN 200 is composed of encoder layers 202 which produce a codeword 204, followed by decoder layers 206 which decode the codeword 204 to produce a reconstructed downlink channel 208. The codeword constraints are received by the NN at 210. The reconstructed downlink channel 208 and the received downlink channel 214 are processed in a cost function 212 to produce an error 216.

For training purpose, the estimated channel is used. In some embodiments, for increased channel estimation accuracy, denser pilot patterns (than those used for conventional data transmission) can be used. As detailed above, training is an offline process. The network sends CSI-RS and the UE measures the downlink channel corresponding to the transmitted CSI-RS (Channel estimation). Noisy observation refers to observing a received signal corresponding to a transmitted CSI-RS.

Different loss/cost functions may be used, e.g., MSE, cosine proximity, etc. for various purposes, for example to optimize beamforming performance at the BS.

The encoder weights and activation functions are obtained as a result of training. Once the NN is trained offline, the information related to encoder layers (weights and activation functions) must be transferred to the UE. The network configures the UE with the information related to encoder layers for example using signaling, such as radio resource control (RRC) signalling. The information related to decoder layers is used at generation NodeB (gNB) for downlink channel reconstruction.

In operation, the results of training the NN are used in the UE and BS. The encoder layers of the trained NN of FIG. 8 with the corresponding activation functions and the obtained weights are used at the UE. Referring to FIG. 9A, the UE processes a received pilot 300 using an encoder 302 that implements the encoder layers of the trained NN and outputs a compressed version of the downlink channel in the form of a codeword 304 and transmits this to the BS.

Figure 8:
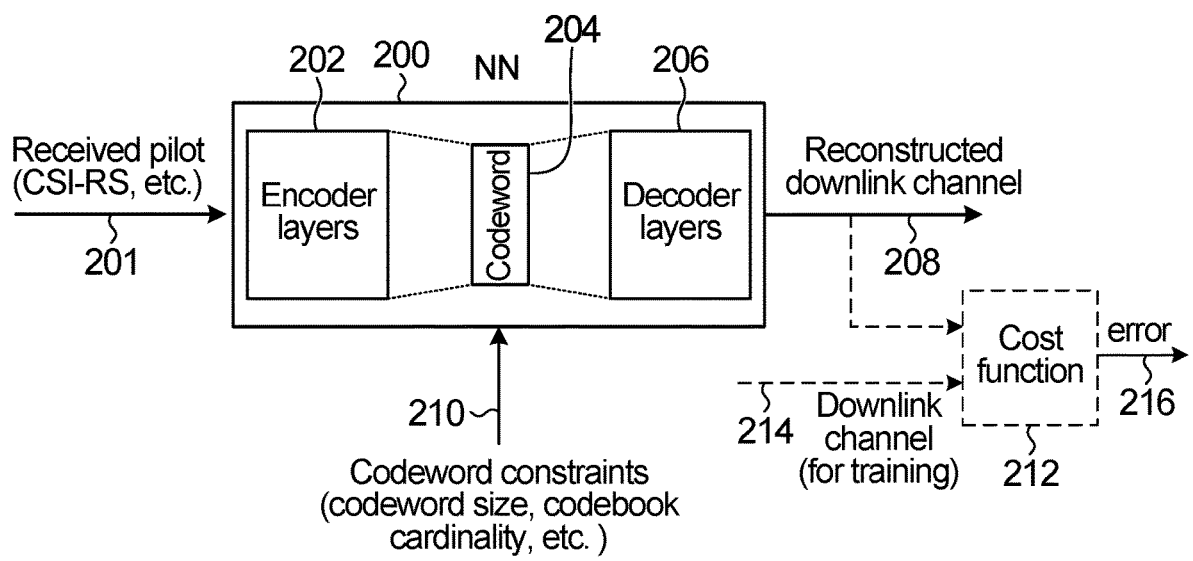
FIG. 8 shows a diagram of training a neural network according to one embodiment.
Figure 9A:
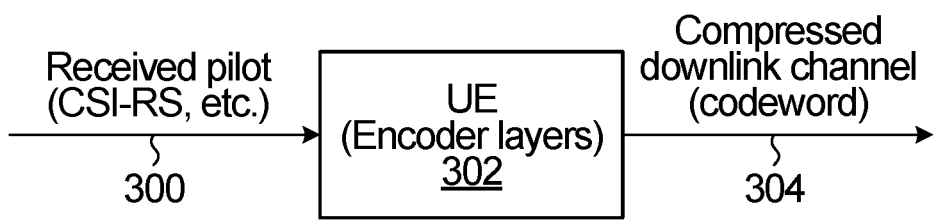
FIG. 9A shows a diagram of the encoder layers of a neural network according to one embodiment.
Figure 9B:
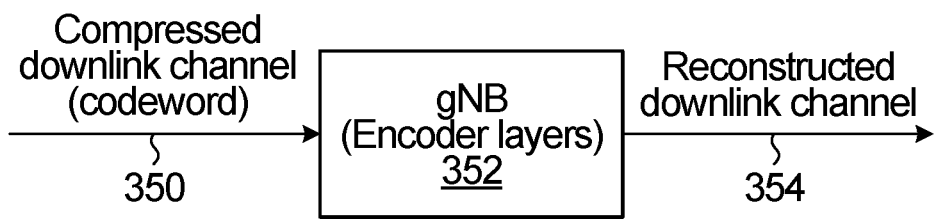
FIG. 9B shows a diagram of the decoder layers of a neural network according to one embodiment.

The decoder layers of the trained NN of FIG. 8 with the corresponding activation functions and the obtained weights are used at the base station (e.g. a gNB). Referring to FIG. 9B, based on the received compressed version (codeword) 350, the BS processes the codeword using a decoder 352 that implements the decoder layers of the trained NN and reconstructs the UE downlink channel 354.

Figure 10:
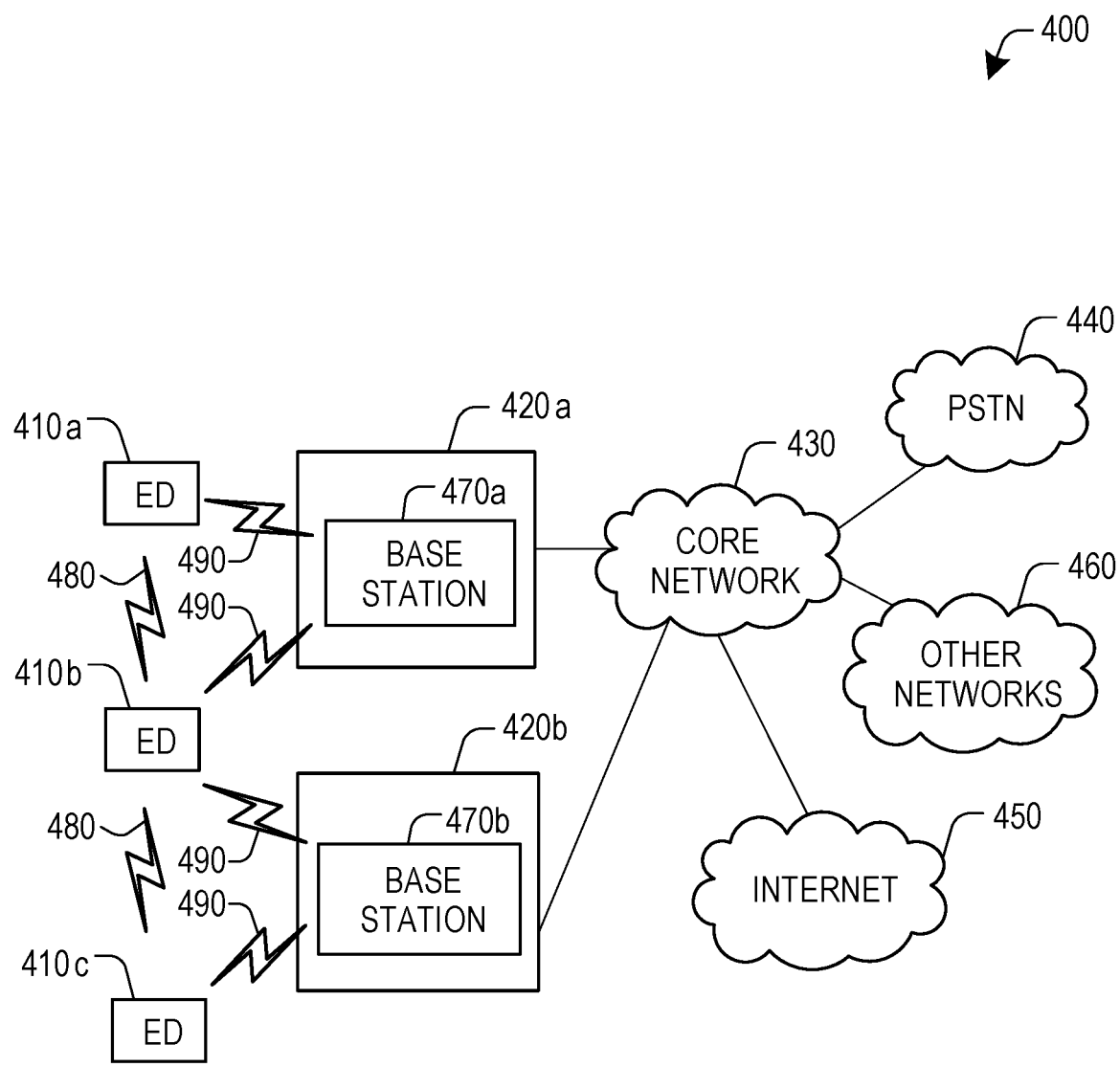
FIG. 10 is a network diagram of a communication system.

FIG. 10 illustrates an example communication system 400 in which embodiments of the present disclosure could be implemented. In general, the communication system 400 enables multiple wireless or wired elements to communicate data and other content. The purpose of the communication system 400 may be to provide content (voice, data, video, text) via broadcast, narrowcast, user device to user device, etc. The communication system 400 may operate by sharing resources such as bandwidth.

In this example, the communication system 400 includes electronic devices (ED) 410a-410c, radio access networks (RANs) 420a-420b, a core network 430, a public switched telephone network (PSTN) 440, the internet 450, and other networks 460. Although certain numbers of these components or elements are shown in FIG. 10, any reasonable number of these components or elements may be included in the communication system 400.

The EDs 410a-410c are configured to operate, communicate, or both, in the communication system 400. For example, the EDs 410a-410c are configured to transmit, receive, or both via wireless or wired communication channels. Each ED 410a-410c represents any suitable end user device for wireless operation and may include such devices (or may be referred to) as a user equipment/device (UE), wireless transmit/receive unit (WTRU), mobile station, fixed or mobile subscriber unit, wireless telephone, station (STA), machine type communication (MTC) device, personal digital assistant (PDA), smartphone, laptop, computer, tablet, wireless sensor, or consumer electronics device.

In FIG. 10, the RANs 420a-420b include base stations 470a-470b, respectively. Each base station 470a-470b is configured to wirelessly interface with one or more of the EDs 410a-410c to enable access to any other base station 470a-470b, the core network 430, the PSTN 440, the internet 450, and/or the other networks 460. For example, the base stations 470a-470b may include (or be) one or more of several well-known devices, such as a base transceiver station (BTS), a Node-B (NodeB), an evolved NodeB (eNodeB), a Home eNodeB, a gNodeB, a transmission point (TP), a site controller, an access point (AP), or a wireless router. Any ED 410a-410c may be alternatively or additionally configured to interface, access, or communicate with any other base station 470a-470b, the internet 450, the core network 430, the PSTN 440, the other networks 460, or any combination of the preceding. The communication system 400 may include RANs, such as RAN 420b, wherein the corresponding base station 470b accesses the core network 430 via the internet 450, as shown.

The EDs 410a-410c and base stations 470a-470b are examples of communication equipment that can be configured to implement some or all of the functionality and/or embodiments described herein. In the embodiment shown in FIG. 10, the base station 470a forms part of the RAN 420a, which may include other base stations, base station controller(s) (BSC), radio network controller(s) (RNC), relay nodes, elements, and/or devices. Any base station 470a, 470b may be a single element, as shown, or multiple elements, distributed in the corresponding RAN, or otherwise. Also, the base station 470b forms part of the RAN 420b, which may include other base stations, elements, and/or devices. Each base station 470a-470b transmits and/or receives wireless signals within a particular geographic region or area, sometimes referred to as a "cell" or "coverage area". A cell may be further divided into cell sectors, and a base station 470a-470b may, for example, employ multiple transceivers to provide service to multiple sectors. In some embodiments there may be established pico or femto cells where the radio access technology supports such. In some embodiments, multiple transceivers could be used for each cell, for example using multiple-input multiple-output (MIMO) technology. The number of RAN 420a-420b shown is an example only. Any number of RAN may be contemplated when devising the communication system 400.

The base stations 470a-470b communicate with one or more of the EDs 410a-410c over one or more air interfaces 490 using wireless communication links e.g. radio frequency (RF), microwave, infrared (IR), etc. The air interfaces 490 may utilize any suitable radio access technology. For example, the communication system 400 may implement one or more channel access methods, such as code division multiple access (CDMA), time division multiple access (TDMA), frequency division multiple access (FDMA), orthogonal frequency division multiple access (OFDMA), or single-carrier FDMA (SC-FDMA) in the air interfaces 490.

A base station 470a-470b may implement Universal Mobile Telecommunication System (UMTS) Terrestrial Radio Access (UTRA) to establish an air interface 490 using wideband CDMA (WCDMA). In doing so, the base station 470a-470b may implement protocols such as HSPA, HSPA+ optionally including HSDPA, HSUPA or both. Alternatively, a base station 470a-470b may establish an air interface 490 with Evolved UTMS Terrestrial Radio Access (E-UTRA) using LTE, LTE-A, and/or LTE-B. It is contemplated that the communication system 400 may use multiple channel access functionality, including such schemes as described above. Other radio technologies for implementing air interfaces include IEEE 802.11, 802.15, 802.16, CDMA2000, CDMA2000 1x, CDMA2000 EV-DO, IS-2000, IS-95, IS-856, GSM, EDGE, and GERAN. Of course, other multiple access schemes and wireless protocols may be utilized.

The RANs 420a-420b are in communication with the core network 430 to provide the EDs 410a-410c with various services such as voice, data, and other services. The RANs 420a-420b and/or the core network 430 may be in direct or indirect communication with one or more other RANs (not shown), which may or may not be directly served by core network 430, and may or may not employ the same radio access technology as RAN 420a, RAN 420b or both. The core network 430 may also serve as a gateway access between (i) the RANs 420a-420b or EDs 410a-410c or both, and (ii) other networks (such as the PSTN 440, the internet 450, and the other networks 460). In addition, some or all of the EDs 410a-410c may include functionality for communicating with different wireless networks over different wireless links using different wireless technologies and/or protocols. Instead of wireless communication (or in addition thereto), the EDs may communicate via wired communication channels to a service provider or switch (not shown), and to the internet 450. PSTN 440 may include circuit switched telephone networks for providing plain old telephone service (POTS). Internet 450 may include a network of computers and subnets (intranets) or both, and incorporate protocols, such as IP, TCP, UDP. EDs 410a-410c may be multimode devices capable of operation according to multiple radio access technologies, and incorporate multiple transceivers necessary to support such.

Figure 11A:
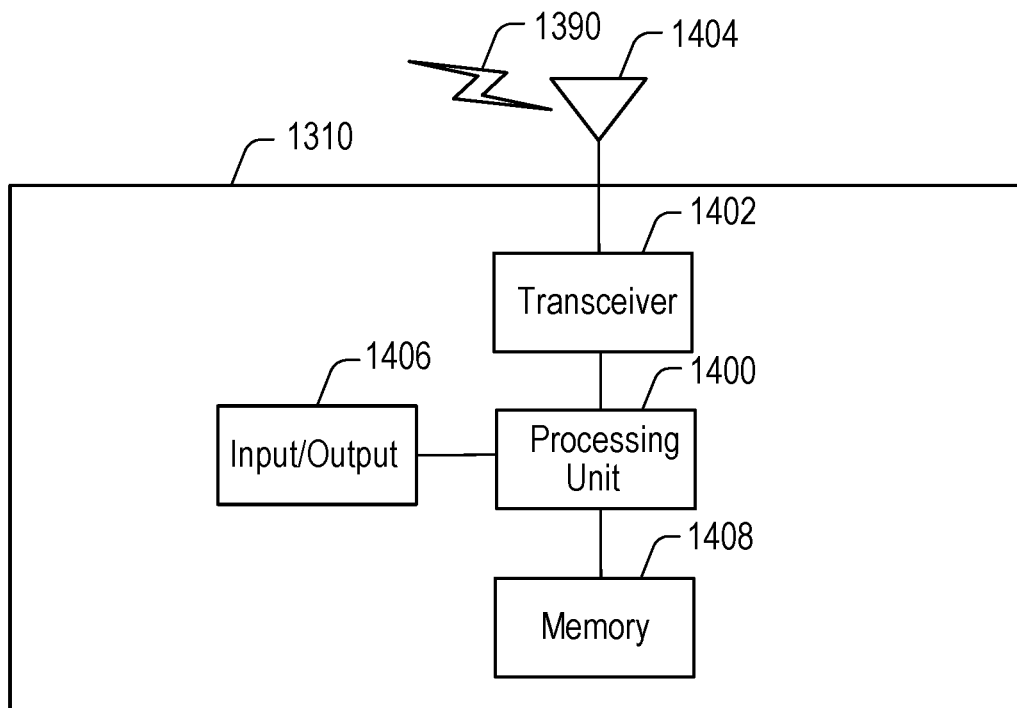
FIG. 11A is a block diagram of an example electronic device.
Figure 11B:
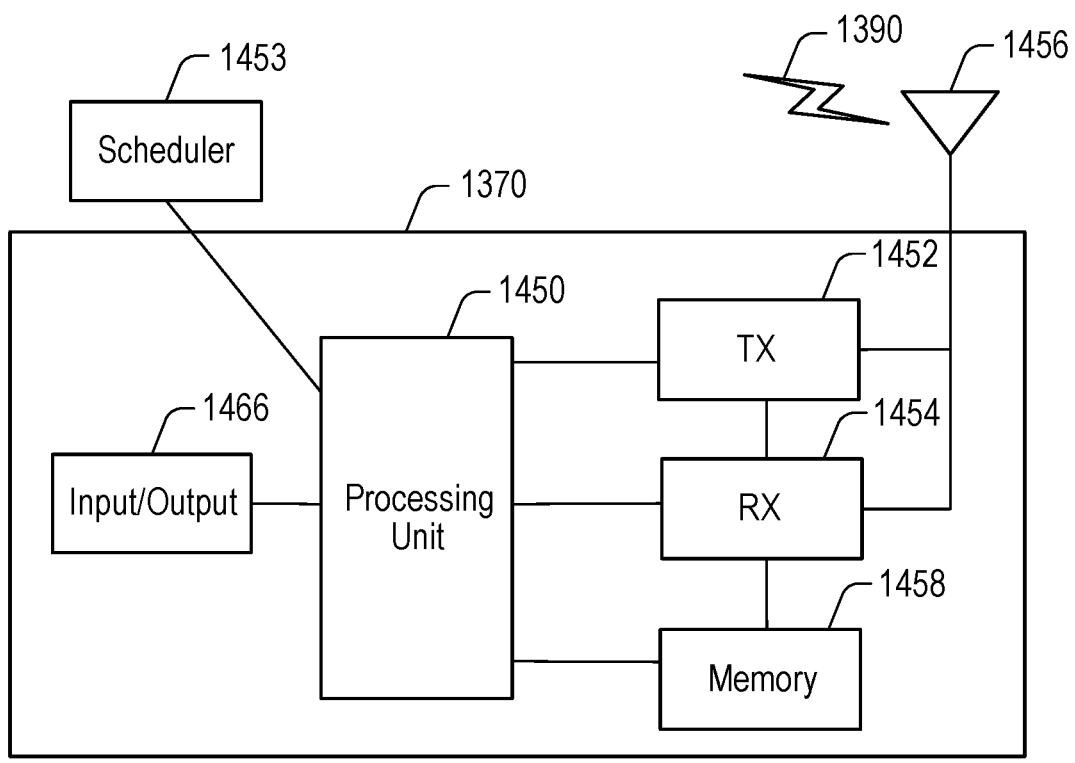
FIG. 11B is a block diagram of an example electronic device.

FIGS. 11A and 11B illustrate example devices that may implement the methods and teachings according to this disclosure. In particular, FIG. 11A illustrates an example ED 1310, and FIG. 11B illustrates an example base station 1370. The base station 1370 communicates with ED 1310 over one or more air interfaces 1390 using wireless communication. These components could be used in the communication system 400 or in any other suitable system.

As shown in FIG. 11A, the ED 1310 includes at least one processing unit 1400. The processing unit 1400 implements various processing operations of the ED 1310. For example, the processing unit 1400 could perform signal coding, data processing, power control, input/output processing, or any other functionality enabling the ED 1310 to operate in the communication system 400. The processing unit 1400 may also be configured to implement some or all of the functionality and/or embodiments described in more detail above. Each processing unit 1400 includes any suitable processing or computing device configured to perform one or more operations. Each processing unit 1400 could, for example, include a microprocessor, microcontroller, digital signal processor, field programmable gate array, or application specific integrated circuit.

The ED 1310 also includes at least one transceiver 1402. The transceiver 1402 is configured to modulate data or other content for transmission by at least one antenna or Network Interface Controller (NIC) 1404. The transceiver 1402 is also configured to demodulate data or other content received by the at least one antenna 1404. Each transceiver 1402 includes any suitable structure for generating signals for wireless or wired transmission and/or processing signals received wirelessly or by wire. Each antenna 1404 includes any suitable structure for transmitting and/or receiving wireless or wired signals. One or multiple transceivers 1402 could be used in the ED 1310. One or multiple antennas 1404 could be used in the ED 1310. Although shown as a single functional unit, a transceiver 1402 could also be implemented using at least one transmitter and at least one separate receiver.

The ED 1310 further includes one or more input/output devices 1406 or interfaces (such as a wired interface to the internet 450). The input/output devices 1406 permit interaction with a user or other devices in the network. Each input/output device 1406 includes any suitable structure for providing information to or receiving information from a user, such as a speaker, microphone, keypad, keyboard, display, or touch screen, including network interface communications.

In addition, the ED 1310 includes at least one memory 1408. The memory 1408 stores instructions and data used, generated, or collected by the ED 1310. For example, the memory 1408 could store software instructions or modules configured to implement some or all of the functionality and/or embodiments described above and that are executed by the processing unit(s) 1400. Each memory 1408 includes any suitable volatile and/or non-volatile storage and retrieval device(s). Any suitable type of memory may be used, such as random access memory (RAM), read only memory (ROM), hard disk, optical disc, subscriber identity module (SIM) card, memory stick, secure digital (SD) memory card, and the like.

As shown in FIG. 11B, the base station 1370 includes at least one processing unit 1450, at least one transmitter 1452, at least one receiver 1454, one or more antennas 1456, at least one memory 1458, and one or more input/output devices or interfaces 1466. A transceiver, not shown, may be used instead of the transmitter 1452 and receiver 1454. A scheduler 1453 may be coupled to the processing unit 1450. The scheduler 1453 may be included within or operated separately from the base station 1370. The processing unit 1450 implements various processing operations of the base station 1370, such as signal coding, data processing, power control, input/output processing, or any other functionality. The processing unit 1450 can also be configured to implement some or all of the functionality and/or embodiments described in more detail above. Each processing unit 1450 includes any suitable processing or computing device configured to perform one or more operations. Each processing unit 1450 could, for example, include a microprocessor, microcontroller, digital signal processor, field programmable gate array, or application specific integrated circuit.

Each transmitter 1452 includes any suitable structure for generating signals for wireless or wired transmission to one or more EDs or other devices. Each receiver 1454 includes any suitable structure for processing signals received wirelessly or by wire from one or more EDs or other devices. Although shown as separate components, at least one transmitter 1452 and at least one receiver 1454 could be combined into a transceiver. Each antenna 1456 includes any suitable structure for transmitting and/or receiving wireless or wired signals. Although a common antenna 1456 is shown here as being coupled to both the transmitter 1452 and the receiver 1454, one or more antennas 1456 could be coupled to the transmitter(s) 1452, and one or more separate antennas 1456 could be coupled to the receiver(s) 1454. Each memory 1458 includes any suitable volatile and/or non-volatile storage and retrieval device(s) such as those described above in connection to the ED 1310. The memory 1458 stores instructions and data used, generated, or collected by the base station 1370. For example, the memory 1458 could store software instructions or modules configured to implement some or all of the functionality and/or embodiments described above and that are executed by the processing unit(s) 1450.

Each input/output device 1466 permits interaction with a user or other devices in the network. Each input/output device 1466 includes any suitable structure for providing information to or receiving/providing information from a user, including network interface communications.

Figure 12:
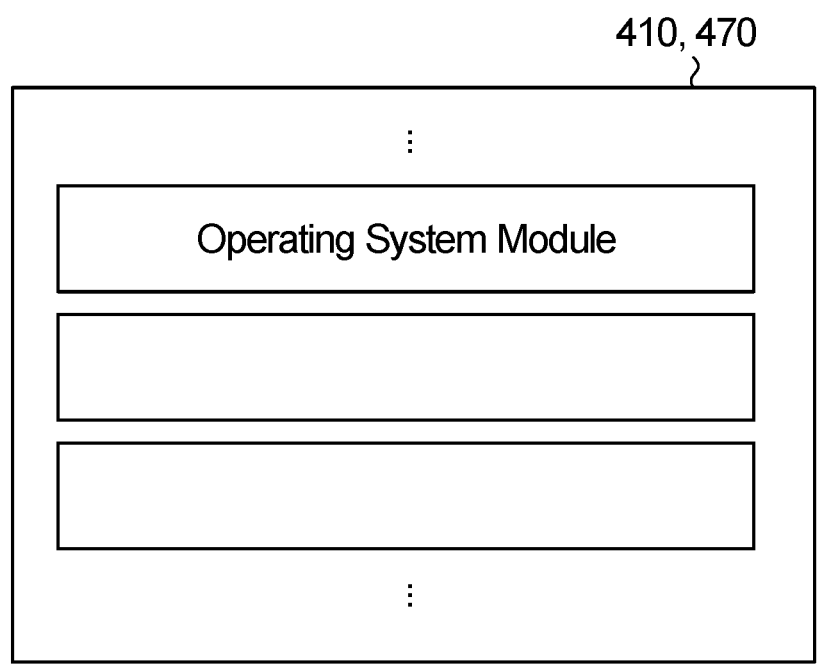
FIG. 12 is a block diagram of component modules.

It should be appreciated that one or more steps of the embodiment methods provided herein may be performed by corresponding units or modules, according to FIG. 12. For example, a signal may be transmitted by a transmitting unit or a transmitting module. A signal may be received by a receiving unit or a receiving module. A signal may be processed by a processing unit or a processing module. Other steps may be performed by an AI module. The respective units/modules may be hardware, software, or a combination thereof. For instance, one or more of the units/modules may be an integrated circuit, such as field programmable gate arrays (FPGAs) or application-specific integrated circuits (ASICs). It will be appreciated that where the modules are software, they may be retrieved by a processor, in whole or part as needed, individually or together for processing, in single or multiple instances as required, and that the modules themselves may include instructions for further deployment and instantiation.

Additional details regarding the EDs 110 and the base stations 170 are known to those of skill in the art. As such, these details are omitted here for clarity.

Numerous modifications and variations of the present disclosure are possible in light of the above teachings. It is therefore to be understood that within the scope of the appended claims, the disclosure may be practiced otherwise than as specifically described herein.

As an example: an extreme interpretation of an AI-based wireless system would be built using hardware dedicated to enabling neural networks at both the network and the UE, where the network would directly upload the entire implementation of a wireless technology (i.e. the air interface, the medium access layers, the network layers, the protocol stack structure) into the UE's memory. This implementation of the wireless technology could be based on existing standards such as UMTS, LTE, NR, WiFi, BlueTooth, some combination of one or more of them, or an entirely new design. Such an AI-based wireless system would no longer be based on any form of specification as the network can determine the whole UE behavior using machine learning and directly upload it to the UE.

The invention claimed is:

1. A method in a user equipment (UE), the method comprising:
 configuring an artificial intelligence (AI) module in a UE to perform at least one task for wireless communications;
 performing the at least one task using the configured AI module;
 receiving signalling from the network informing the UE of the at least one task the UE is to perform using the configured AI module;
 wherein the at least one task comprises one or more of:
  channel estimation;
  control signal reception and/or data signal reception;
  control signal and/or data signal demodulation;
  downlink and/or uplink spatial domain filtering;
  radio link monitoring;
  mobility management and reporting;
  beam management and reporting;
  channel state information feedback;
  interference cancellation;
  equalization;
 the method further comprising receiving signalling from the network with parameters for use in configuring the AI module, the parameters configuring one or more of:
 input type and/or output type;
 Size and format;
 Layer configuration;
 Feature map size;
 Format;
 Number of neurons;
 Coefficients of link between neurons of neighboring layers;
 Activation functions;
 the method further comprising:
 activating the AI module upon insertion of a subscriber identity module (SIM) card in the UE;
 wherein configuring the AI module in the UE to perform at least one task for wireless communications is based on parameters stored in the SIM card.

2. The method of claim 1 further comprising:
 receiving a UE capability enquiry message from a network;
 responding to the UE capability enquiry with a UE capability response message indicating the UE's AI capability;
 receiving signalling to configure the UE to perform a given wireless communications task.

3. The method of claim 1 further comprising:
 receiving a UE capability enquiry message from a network;
 responding to the UE capability enquiry with a UE capability response message indicating the UE's AI capability;
 receiving signalling to configure the UE to perform a given wireless communications task;
 receiving signalling containing parameters for the UE to configure its AI module.

4. A user equipment (UE) comprising:
 A processor and memory;
 at least one antenna;
 an artificial intelligence (AI) module;
 wherein the AI module is configured to perform at least one task for wireless communications and to receive signalling from the network informing the UE of the at least one task it is to perform using the configured AI module;
 wherein the at least one task comprises one or more of:
  channel estimation;
  control and/or data signal reception;
  control and/or data signal demodulation;
  downlink and/or uplink spatial domain filtering;
  radio link monitoring;
  mobility management and reporting;
  beam management and reporting;
  channel state information feedback;
  interference cancellation;
  equalization;
 wherein the UE is configured to receive signalling from the network with parameters to configure the AI module for use in configuring the AI module by receiving one or more of:
 input type and/or output type;
 Size and format;
 Layer configuration;
 Feature map size;
 Format;
 Number of neurons;
 Coefficients of link between neurons of neighboring layers;
 Activation functions;
 the UE further comprising:
 a subscriber identity module (SIM) card slot;
 wherein the UE is configured to:
 activate the AI module upon insertion of a subscriber identity module (SIM) card in the SIM card slot;
 wherein the AI module is configured to perform at least one task for wireless communications based on parameters stored in the SIM card.

5. The UE of claim 4 further configured to:
 receive a UE capability enquiry message from a network;
 respond to the UE capability enquiry with a UE capability response message indicating the UE's AI capability;
 receive signalling to configure the UE to perform a given wireless communications task.

6. The UE of claim 4 further configured to:
 receive a UE capability enquiry message from a network;
 respond to the UE capability enquiry with a UE capability response message indicating the UE's AI capability;
 receive signalling to configure the UE to perform a given wireless communications task;
 receiving signalling containing parameters for the UE to configure its AI module.

* * * * *